United States Patent
Summers et al.

(10) Patent No.: US 7,124,189 B2
(45) Date of Patent: Oct. 17, 2006

(54) SPONTANEOUS VIRTUAL PRIVATE NETWORK BETWEEN PORTABLE DEVICE AND ENTERPRISE NETWORK

(75) Inventors: David L. Summers, Salt Lake City, UT (US); Darren L. Wesemann, North Salt Lake City, UT (US)

(73) Assignee: Intellisync Corporation, San Jose, CA (US)

( * ) Notice: Subject to any disclaimer, the term of this patent is extended or adjusted under 35 U.S.C. 154(b) by 707 days.

(21) Appl. No.: 09/767,465

(22) Filed: Jan. 22, 2001

(65) Prior Publication Data

US 2002/0099826 A1     Jul. 25, 2002

Related U.S. Application Data

(60) Provisional application No. 60/257,481, filed on Dec. 20, 2000.

(51) Int. Cl.
*G06F 15/16*     (2006.01)

(52) U.S. Cl. ............... 709/227; 709/229; 709/217; 709/219; 709/225; 379/901

(58) Field of Classification Search .............. None
See application file for complete search history.

(56) References Cited

U.S. PATENT DOCUMENTS

| | | | | |
|---|---|---|---|---|
| 6,032,227 A * | 2/2000 | Shaheen et al. | ............ | 711/129 |
| 6,061,796 A * | 5/2000 | Chen et al. | ............ | 713/201 |
| 6,081,900 A | 6/2000 | Subramaniam et al. | ..... | 713/201 |
| 6,092,113 A | 7/2000 | Maeshima et al. | .......... | 709/230 |
| 6,092,200 A | 7/2000 | Muniyappa et al. | ........ | 713/201 |
| 6,138,049 A * | 10/2000 | McLaughlin | ................ | 700/67 |
| 6,178,505 B1 | 1/2001 | Schneider et al. | .......... | 713/168 |
| 6,226,748 B1 | 5/2001 | Bots et al. | ................... | 713/201 |
| 6,229,809 B1 | 5/2001 | Murphy et al. | ............. | 370/401 |
| 6,233,608 B1 * | 5/2001 | Laursen et al. | ............. | 709/217 |
| 6,292,905 B1 * | 9/2001 | Wallach et al. | ................ | 714/4 |
| 6,295,551 B1 * | 9/2001 | Roberts et al. | ............. | 709/205 |
| 6,411,986 B1 * | 6/2002 | Susai et al. | ................. | 709/203 |
| 6,529,500 B1 * | 3/2003 | Pandharipande | ............ | 370/352 |
| 6,546,425 B1 * | 4/2003 | Hanson et al. | ............. | 709/227 |
| 6,563,800 B1 * | 5/2003 | Salo et al. | ................... | 370/264 |

(Continued)

OTHER PUBLICATIONS

Aqun et al. "Research on Tunneling Techniques in Virtual Private Networks", IEEE, Aug. 2000, pp. 691-697, especially pp. 692-696.

*Primary Examiner*—Bunjob Jaroenchonwanit
*Assistant Examiner*—Dohm Chankong
(74) *Attorney, Agent, or Firm*—Workman Nydegger (57) ABSTRACT

An enterprise network opens a virtual private network tunnel with a data center by sending the data center a data request that includes a uniform resource identifier. The data center responds by sending the enterprise network ongoing reply data. A user wishing to access network data of the enterprise network transmits an access request to the data center. The data center authenticates the identity of the user and transmits the access request to the enterprise network. The enterprise network responds to the access request by performing acts upon the network data and/or by returning network data to the data center such that the user is enabled access to the network data. In an alternative embodiment, the data center caches a copy of network data to be retrieved by a remote user when the same network data is disconnected from the enterprise network.

45 Claims, 5 Drawing Sheets

U.S. PATENT DOCUMENTS

| | | |
|---|---|---|
| 6,609,148 B1 * | 8/2003 | Salo et al. .................. 709/217 |
| 6,631,416 B1 * | 10/2003 | Bendinelli et al. .......... 709/217 |
| 6,765,881 B1 * | 7/2004 | Rajakarunanayake ....... 370/256 |
| 6,801,509 B1 * | 10/2004 | Chuah et al. ................ 370/328 |
| 6,874,030 B1 * | 3/2005 | Sheth et al. ................ 709/229 |
| 2002/0023210 A1 * | 2/2002 | Tuomenoksa et al. ...... 713/161 |

* cited by examiner

SPONTANEOUS VIRTUAL PRIVATE NETWORK BETWEEN PORTABLE DEVICE AND ENTERPRISE NETWORK

RELATED APPLICATION

This application claims the benefit of U.S. Provisional Patent Application Ser. No. 60/257,481, entitled "SECURE ACCESS SESSION WITHOUT MODIFYING EXISTING FIREWALL," and filed Dec. 20, 2000, which is incorporated herein by reference.

BACKGROUND OF THE INVENTION

1. The Field of the Invention

The present invention relates to methods and systems for enabling a user to access data over a virtual private network. More particularly, the present invention relates to methods and systems for providing a user with controlled mobile remote access to network data over a spontaneous virtual private network.

2. Background and Related Art

In today's business world, many businesses protect their data from unauthorized access by installing firewalls into their network infrastructure. Typically, a firewall is configured to prevent unidentified users from accessing network data from a remote location. Although firewalls are generally very beneficial for enabling a business to have more control over who accesses its network data, they also have the undesirable consequence of disconnecting mobile professionals from critical and urgent business information when they are away from the office or otherwise unable to gain local access to the network data.

To enable a mobile professional to access business information from a remote location, some businesses have installed virtual private networks (VPNs) between the business and designated remote locations, such as from a professional's home or satellite office. The function of a VPN is to open a secure connection between the business network and a designated remote location through the business firewall. Although beneficial for providing remote access to network data, a VPN requires the installation of expensive hardware and/or software at the business network and sometimes at the remote location.

Figure 1:
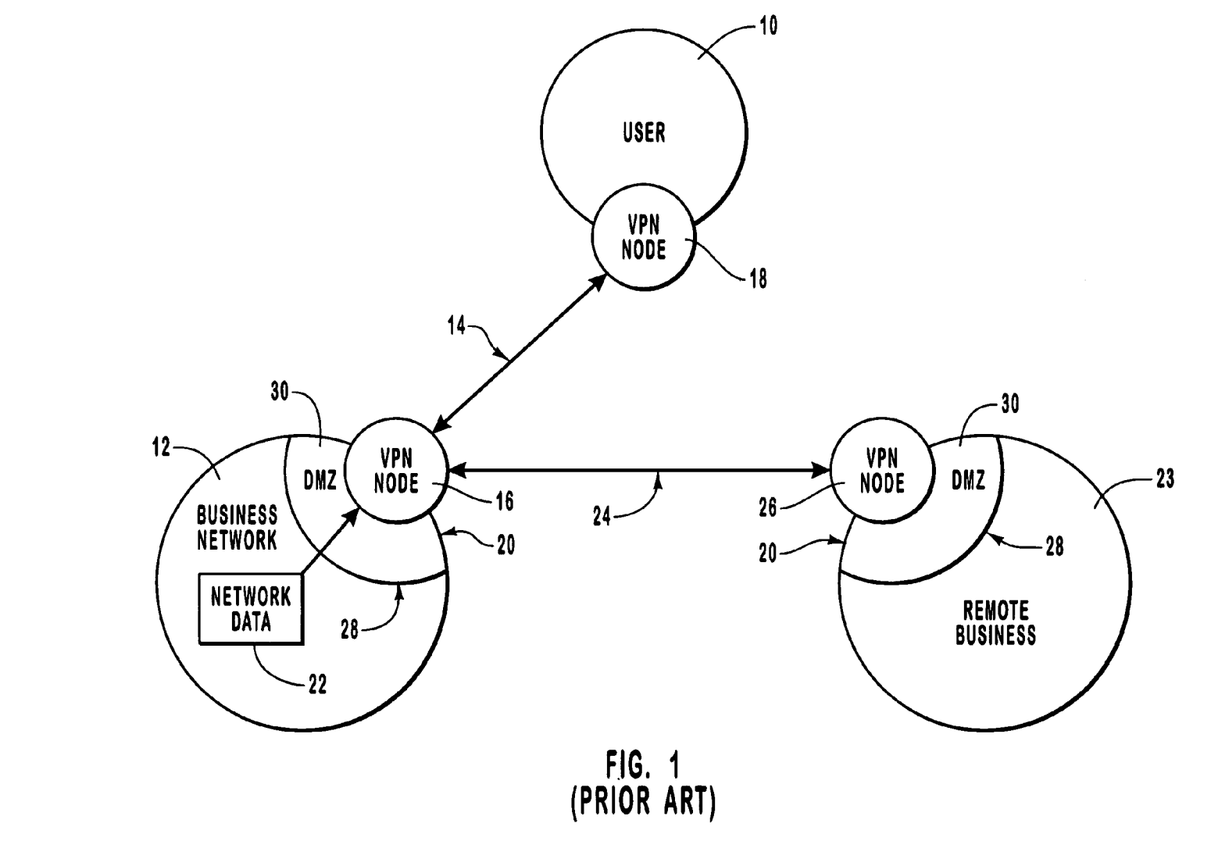
FIG. 1 illustrates a prior art system for enabling a user and a remote enterprise network to access a business's data through virtual private network tunnels.

An embodiment of a prior art system and method for enabling remote access to network data over a VPN is shown in FIG. 1. As shown, a user 10 communicates with the business network 12 from a remote location through a VPN tunnel 14. At each end of the VPN tunnel 14 is a VPN node 16, 18. At the business network 12, the VPN node 16 straddles the business network's firewall 20. Network data 22 is transmitted through the firewall 20 at the VPN node 16 and through the VPN tunnel 14 to the user 10. According to the prior art, it is also possible for a remote business 23 to communicate with the business network 12 through a VPN tunnel 24, as shown between VPN node 16 and VPN node 26.

VPN hardware and software employ encryption technology and other security features at the VPN nodes to ensure that data transmitted through a VPN tunnel is not intercepted and that the user or remote business is authorized to access the business network data. The benefits of a VPN, however, are limited to discrete remote locations where the appropriate VPN software and/or hardware is installed. Accordingly, VPNs do not currently provide users with mobile remote access to network data stored behind business firewalls. In particular, a prior art VPN does not enable a user to access network data from a telephone while commuting in a moving vehicle.

There are also consequences associated with establishing a prior art VPN. In particular, a VPN requires a port or hole to be opened in the business firewall so that data can be transmitted between the business network and the remote VPN node. It is over the VPN port that hardware or software must be installed to ensure that only authorized users are provided access to the network data. However, despite the security mechanisms of the VPN to authenticate the identity of the user, the potential for a hacker to obtain unauthorized access to the business network is increased. For instance, a hacker may attack the firewall at the business VPN node or may obtain unauthorized access to network data by hacking into a remote user's computing device at the remote VPN node location. To prevent hackers from gaining access to network data, many businesses install secondary firewalls, so that if a hacker comes through the first firewall, they are more likely to be stopped before they penetrate the secondary firewall.

FIG. 1 illustrates a typical firewall configuration for preventing unauthorized access to network data. This firewall configuration includes a primary firewall 20, a secondary firewall 28, and a demilitarized zone (DMZ) 30, which is the area between the primary firewall 20 and the secondary firewall 28.

Many businesses install proxy servers to intercept and filter data transmitted through the business's firewall infrastructure. Proxy servers are also beneficial for many other reasons, one of which is to enable users to access the Internet from behind a business firewall while enabling a business to limit the Internet sites that can be accessed. Proxy servers also hide the true identity of the Internet user by acting as a proxy in transmitting user requests. By acting as a proxy in transmitting user requests, the proxy server is able to filter user requests so that only qualified requests are honored. In essence, a proxy server can enhance the protection of a firewall infrastructure by prohibiting unauthorized requests from being honored. Proxy servers are particularly important for businesses that permit employees to access the Internet because Internet access requires additional holes or ports to be opened in the firewall infrastructure. Typically these ports include "port 80" and "port 443." A firewall and proxy server can collectively operate to prevent unauthorized users on the Internet from obtaining control over the business network by ensuring that data transmitted through the ports complies with defined protocols. Even though Internet access initiated from within a business typically requires "port 80" and "port 443" to be opened in the firewall, the potential for a hacker to gain unauthorized remote access to a business network through "port 80" and "port 443" can be substantially limited by using appropriate firewall and proxy server configurations.

The hole created in the firewall by a VPN, however, is difficult to police even with effective VPN hardware and software. A VPN also increases the number of fronts that have to be monitored, including the newly opened VPN port in the business firewall and each of the remote VPN nodes. Accordingly, although VPNs are beneficial for enabling authorized users to access network data from remote locations, VPNs are likewise detrimental for facilitating unauthorized access to network data from remote locations. VPNs make it difficult to police business firewalls, make it difficult to use proxy servers, and in consequence, weaken firewalls and provide users, authorized or not, with too much control over network data. VPNs can also be very expensive to install and maintain. Nevertheless, because of today's business need for mobile professionals to have access to critical and urgent information away from the office, many businesses are willing to expend the resources and take the risks that are associated with establishing VPNs.

In view of the foregoing, there is currently a need in the art for providing mobile professionals with controlled access to network data that is stored behind business firewalls, without weakening the associated firewall infrastructure and in an economic manner. There is also a need for providing users with mobile remote access to network data through a VPN, such that network data does not have to be obtained from discrete, predefined, remote VPN node locations. For example, it would be an advancement in the art to enable a mobile professional to access email messages through a VPN, while the mobile professional is commuting in a moving vehicle from a portable telephone device.

SUMMARY OF THE INVENTION

The present invention relates to methods and systems for providing users with controlled mobile remote access to business network data through a virtual private network (VPN), without requiring the installation of expensive software or hardware at the business firewall, and without opening additional ports or holes in the business's firewall that would weaken the firewall infrastructure, but rather by establishing a secure data tunnel through a pre-opened Internet port.

The present invention enables a mobile professional to remotely access critical and urgent business information such as email, from behind a business firewall, while on the move, without requiring remote access to be obtained from predefined, discrete VPN node locations that must be configured with expensive VPN software and hardware.

A remote user is enabled to access network data from a business or enterprise location by communicating with a data center that has an established data tunnel with the enterprise network. The data tunnel is established when the enterprise network transmits an initial data request to the data center and the data center replies with an ongoing transmission of reply data. The enterprise network transmits the initial data request and receives the reply data through a pre-opened network port, such as through Internet "port 80" or "port 443." The data center uses a web server to communicate with the enterprise network and the enterprise network uses a spontaneous virtual private network (SVPN) module to communicate with the data center.

In one embodiment, the SVPN module initiates a data request from within the enterprise network and monitors the resulting communication channel to ensure that it remains open. If the channel is closed for any reason, the SVPN module reinitiates the data request and opens a new channel. The data request includes a uniform resource identifier (URI), or a request to access resources associated with a web server of the data center. In response to this request, the web server of the data center transmits reply data associated with the URL back to the enterprise network in an ongoing manner so that the communication channel between the data center and the enterprise network remains open. In effect, the data center never completes the transmission of the reply data to the enterprise network. The web server also updates a database of the data center of the status of any open communication channels. The database is particularly useful when the data center includes multiple web servers, only one of which has an open communication channel with the enterprise network.

The channel of communication between the data center and the enterprise network is a data tunnel that operates as a VPN tunnel. Using Transmission Control Protocol/Internet Protocol (TCP/IP), HyperText Transfer Protocol with Secure Sockets Layer Protocol (HTTPS), and IP Security Protocol (IPsec), data is encrypted in packets and transmitted through the data tunnel using "port 443" of the enterprise network. In another embodiment, the data tunnel is established through "port 80" and the data is encrypted using TCP/IP, IPsec, and HyperText Transfer Protocol (HTTP) without using Secure Sockets Layer Protocol (SSL). In one embodiment, a proxy server screens data transmitted through the ports to ensure compliance with the defined protocols.

A remote user wishing to access network data from the enterprise network opens a line of communication with the data center using a communication device such as a telephone device or a computer device that is connected to the Internet. The user then generates a request to access network data and transmits the request to the data center. If a telephone device is used, then the data center receives the access request at a telephony node and the telephony node transmits the access request to one of the web servers included in the data center. If the web server has an established data tunnel with the enterprise network, then the access request is transmitted from the web server to the SVPN module of the enterprise network through the data tunnel. If, however, there is not an open data tunnel between the web server and the enterprise network then the web server checks the database to see if there is another server of the data center that is transmitting reply data to the enterprise network through an established data tunnel. If there is another web sever maintaining an open data tunnel with the enterprise network, then the telephony node is notified and the access request is redirected to the other web server and subsequently transmitted from the other web server to the SVPN module of the enterprise network.

The enterprise network processes the access request that is received at the SVPN module by performing any act on the network data that the SVPN module is configured to allow. In one embodiment, processing the access request includes retrieving email data or web page data and transmitting the data back to the user. The SVPN module is configured in another embodiment to allow predefined functions to be performed on the network data, while preserving a business's control over what data a remote user can access and manipulate. The predefined functions include, but are not limited to deleting email messages and faxing email messages to the user.

The SVPN module establishes a second data tunnel with the data center by transmitting to the data center any requested data. The second data tunnel is a temporary data tunnel and is established between the enterprise network and the same web server that is in communication with the enterprise network over the first data tunnel. The second data tunnel is closed and the remote user is provided access to the network data as soon as the network data is received by the data center. If a telephone device is used by the user to communicate with the data center, then the requested network data is transmitted from the web server through the telephony node of the data center to the user's telephone device in an intelligible format, such as a digital display format or an audio format. For example, when the network data comprises an email message, the text of the email can be displayed on the liquid crystal display (LCD) of the user's telephone device or read to the user over the telephone device. Alternatively, a user can access network data directly over the Internet by opening an Internet communication link directly with the web server of the data center.

In one embodiment, the data center authenticates the identity of the user before the user is enabled access to the requested network data. This is accomplished by requiring the user to enter a secret personal identification number.

In view of the forgoing, it should be appreciated that the present invention is an improvement over the prior art. In particular, the present invention enables a user to have mobile remote access to network data over a secure data tunnel while preserving a business's ability to limit how much access to network data is permitted through the data tunnel.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention extends to both methods and systems for enabling user access to network data of an enterprise network through a spontaneous virtual private network from a mobile remote location using a portable device.

A user generates an access request for network data, such as email, using a telephone or computer device, and transmits the access request to a data center. The data center authenticates the identity of the user and transmits the access request to the appropriate enterprise network through an established data tunnel that operates as a virtual private network (VPN). The data tunnel is opened in response to a data request that is transmitted from the enterprise network to the data center. Upon receiving the access request, the enterprise network retrieves network data and transmits the network data through a second data tunnel to the data center where it is subsequently transmitted to the user.

Embodiments of the present invention include or are incorporated in computer-readable media having computer-executable instructions or data structures stored thereon. Examples of computer-readable media include RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network, tunnel, channel or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. The computer-executable instructions and associated data structures or modules represent an example of program code means for executing the steps of the invention disclosed herein.

The invention further extends to computer systems for enabling a remote user access to network data of an enterprise network that is stored behind enterprise network firewalls. This includes, but is not limited to, opening data tunnels that operate as virtual private networks between the enterprise network and a data center, and transmitting network data through the data tunnels. Those skilled in the art will understand that the invention may be practiced in many environments with many types of computer and telephone systems, including portable computers, telephones, wireless telephones, PDA's, personal computers, multi-processor systems, network PCs, minicomputers, mainframe computers and the like.

1. System Environment

Figure 2:
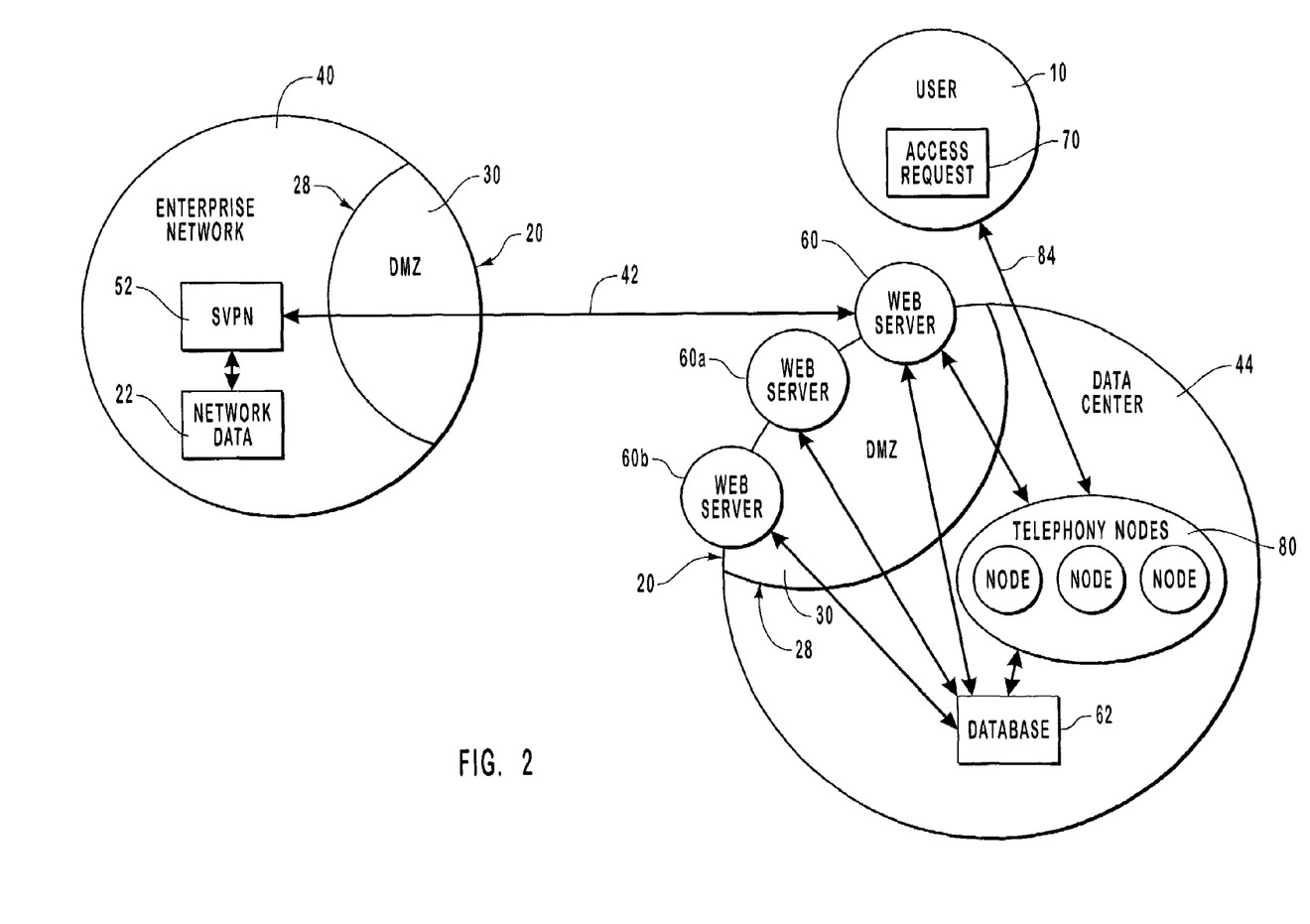
FIG. 2 illustrates, in exemplary system that provides a suitable operating environment for the present invention, an enterprise network in communication with a web server of a data center and a user in communication with a telephony node of the data center.

FIG. 2 illustrates an embodiment of the systems and methods of the present invention for enabling a user 10 to access network data 22 of an enterprise network 40 through a data tunnel 42 that operates as a virtual private network (VPN) between a data center 44 and the enterprise network 40. In one embodiment, enterprise network 40 is a computer network of a business that contains network data 22 protected behind firewalls 20 and 28 from unauthorized access.

As used herein, the term "enterprise network" should be broadly construed to include any computing environment where tasks are performed by processing devices that are linked together. The enterprise network 40 may include, for example, the computing environment of any business, corporation, individual, or other entity. In the enterprise network 40, computer-executable instructions and program modules for performing the features of the invention may be located in local and remote memory storage devices.

The terms "network data" and "business network data" should be construed to include any data that is stored in local and remote memory storage devices and is accessible to the enterprise network 40. Network data 22 may include for example, email data or web page data. In one embodiment, network data 22 is protected behind a firewall infrastructure that includes firewalls 20 and 28. It should be appreciated, however, that network data 22 may include any data that is accessible to the enterprise network 40, even if it is not protected behind the firewall infrastructure The term "tunnel" should be interpreted to include any channel or other line of communication through which data can be securely transmitted. One skilled in the art will appreciate that there are numerous protocols and methods of encryption and authentication that can be employed to enable secure communication through a tunnel, such that the data transmitted through the tunnel is delivered only to an identified user who is authorized to access said data. It should further be appreciated that the terms "tunnel," "data tunnel," and "channel," are interchangeable, as used herein. The tunnel operates as a virtual private network by enabling secure remote access to network data through a business's firewall infrastructure.

Figure 3:
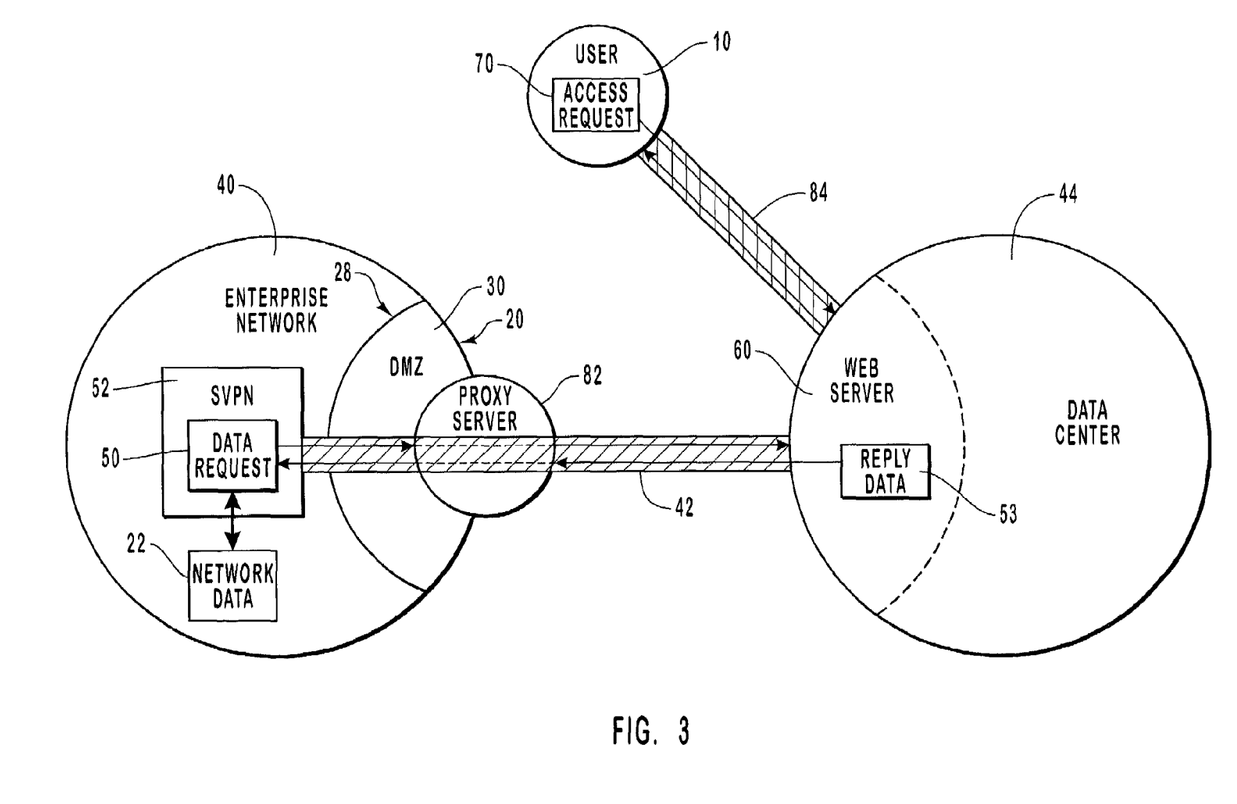
FIG. 3 illustrates a method for establishing a data tunnel between an enterprise network and a data center which includes transmitting a data request from the enterprise network to the data center, and the enterprise network receiving reply data from the data center.

According to the present invention, as shown in FIG. 3, a data tunnel 42 is established between the enterprise network 40 and the data center 44. The data tunnel 42 is opened when the enterprise network 40 transmits a data request 50 to the data center 44 and the data center 44 replies with an ongoing transmission of reply data 53. As used herein, the term "data request" should be broadly construed to include a request for data from the data center and may include a uniform resource identifier (URI), which represents request for the data center to provide access to a web page, HyperText Markup Language HTML) data, Extensible Markup Language (XML) data, or other data resources of web server 60.

As shown, data request 50 and reply data 53 are transmitted through firewalls 20 and 28 of the enterprise network 40. One skilled in the art will appreciate that firewalls 20 and 28 can include hardware, software, or a combination of both. Essentially, a firewall is a security mechanism that prohibits access through designated ports of a network and ensures network data cannot be accessed from an unauthorized user from outside of the firewall.

Also shown in FIG. 3, the data center 44 receives the data request 50 at a server, which in this embodiment includes web server 60. It should be appreciated that data center 44 may comprise multiple web servers 60, 60a, and 60b, as shown in FIG. 2. Multiple web servers 60, 60a, and 60b, enable the data center 44 to communicate with multiple enterprise networks and to maintain multiple data tunnels, not shown. It should be appreciated that according to the present invention, multiple data tunnels can be established between a single enterprise network and a single web server or between a single enterprise network and multiple web servers.

Returning now to FIG. 3, the enterprise network 40 uses a spontaneous virtual private network (SVPN) module 52 to actually transmit the data request 50 to the data center 44 and to receive the reply data 53 in response. Reply data 53 should be construed to include any data transmitted by the data center in response to receiving the data request 50 and which is transmitted in an ongoing manner so as to keep open the tunnel 42 between the data center 44 and the enterprise network 40. In one embodiment, this is accomplished when the enterprise network 40 requests that the web server 60 open a web page, which can be any type of data resource, such as an HTML document or XML document, provided by the web server 60. In response, web server 60 initiates the transmission of the web page and transmits it in an ongoing manner at a rate such that the transmission of the data has an indefinitely long duration. This keeps the tunnel 42 open by continually transmitting reply data 53 to the enterprise network 40.

The SVPN module 52 monitors the tunnel 42 to ensure that the tunnel 42 remains open. If for any reason the tunnel 42 is closed, the SVPN module opens a new data tunnel with the data center 44 by transmitting a new data request to the data center 44. Although several acts are described herein as being specifically performed by the SVPN module 52, it should be appreciated that inasmuch as the enterprise network 40 comprises the SVPN module 52, any acts performed by the SVPN module 52 are also acts performed by the enterprise network 40.

Returning now to FIG. 2, the data center 44 includes a database 62. Database 62 keeps track of any data tunnel 42 that is maintained by web server 60. Web server 60 communicates with database 62 and notifies the database 62 of the status of the data tunnel 42. This enables the data center 44 to transmit a user's request for network data 22 to the appropriate web server 60. A user request for network data 22 is referred to herein as access request 70. Access request 70 is received by the data center 44 through a line of communication 84 that is initiated by the user 10.

In one embodiment, the user 10 generates the access request 70 and transmits the access request 70 to the data center 44 using a telephone device. According to this embodiment, telephony nodes 80 of the data center 44 receive the access request 70 from the user 10. Upon receiving an access request 70, the telephony nodes 80 communicate with web server 60. If web server 60 has a data tunnel 42 established with an appropriate enterprise network 40 from which network data 22 is requested, then the access request 70 is transmitted to the web server 60. However, if the web server 60 does not have a tunnel 42 established with the appropriate enterprise network 40, then the web server 60 communicates with the database 62 to determine which web server, if any, does have a tunnel 42 established with the appropriate enterprise network 40, in which case the access request 70 is redirected to the appropriate web server.

In an alternative embodiment, the telephony nodes 80 communicate directly with the database 62 to ascertain which web server has an established tunnel with the appropriate enterprise network 40 from which the access request 70 requires network data 22 to be accessed. In yet another embodiment, a user initiates a line of communication 84 directly with the web server 60. This is accomplished, for example, when the user accesses the web server 60 over the Internet, or when a web page of the web server 60 is opened by the user over the Internet by means of a personal computer or another device that can provide graphical access to data.

The data tunnel 42 between the data center 44 and the enterprise network 40 uses Transmission Control Protocol/Internet Protocol (TCP/IP), HyperText Transfer Protocol with Secure Sockets Layer Protocol (HTTPS), and IP Security Protocol (IPsec). Using these protocols, data requests, network data, reply data and access requests are encrypted in packets and transmitted through the data tunnel 42 using "port 443", not shown, of the enterprise network. "Port 443" is already open to enable users to access the Internet from the enterprise network 40, within the firewalls 20 and 28.

Figure 4:
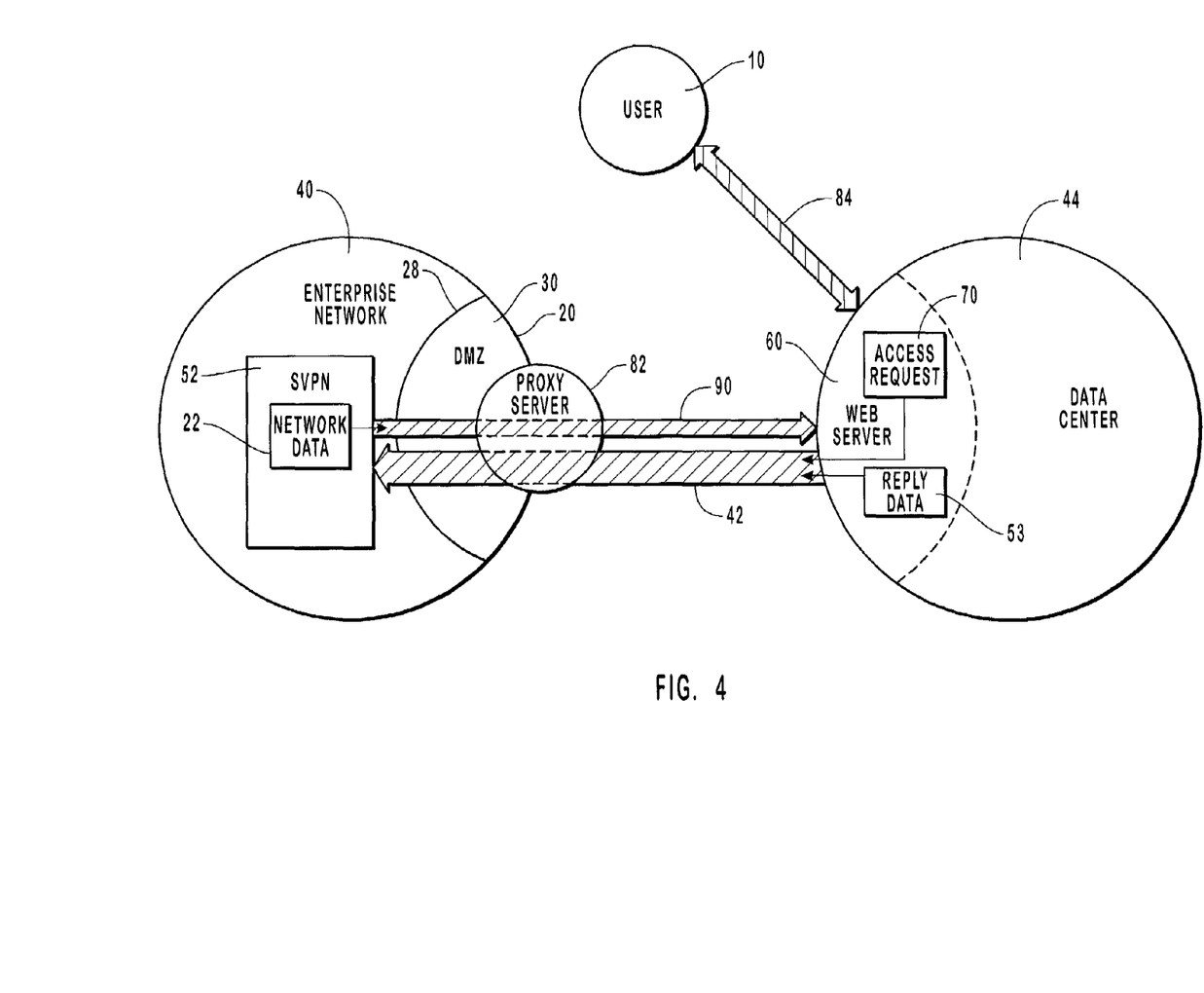
FIG. 4 illustrates a method for transmitting network data from an enterprise network to a data center to enable a user access to the network data, wherein network data is transmitted through a data tunnel between the enterprise network and a data center.

In another embodiment the data tunnel 42 is established through "port 80" of the enterprise network, such that the data requests, network data, reply data and access requests are is encrypted using TCP/IP, IPsec, and HyperText Transfer Protocol (HTTP) without using Secure Sockets Layer Protocol (SSL). It should be appreciated that the present invention may utilized any Internet tunneling protocol, including Layer Two Forwarding (L2F), and Layer Two Tunneling Protocol (L2TP). Port "80" is also already open to enable Internet access from within the firewall infrastructure of the enterprise network 40. According to this embodiment, proxy server 82, as shown in FIGS. 3–4, filters through the data packets to verify that they comply with the defined protocols If a data request 50, network data 22, reply data 53, or access request 10 is not properly packetized then the proxy server 82 will not permit it to pass through the data tunnel 42. In this manner, the proxy server 82 enhances the protection of the firewall infrastructure by ensuring that only authorized data transmissions and requests are transmitted into or out of the enterprise network 40 through the data tunnel 42.

As described, the present invention uses preexisting open ports in the firewall infrastructure to enable secure VPN type communication from remote mobile locations. Accordingly, it should also be appreciated that the present invention is an improvement over the prior art because additional ports are not required to be opened in the firewall infrastructure, which would require the installation of sophisticated and expensive VPN hardware and software. Furthermore, the present invention enables a proxy server to filter any data packets transmitted through the ports to ensure compliance with the defined protocols.

The system and environment just described is a suitable environment and system for practicing the method of the present invention for enabling a user access to network data of an enterprise network through a virtual private network from a remote location using a portable device.

2. User Access to Network Data

Figure 5:
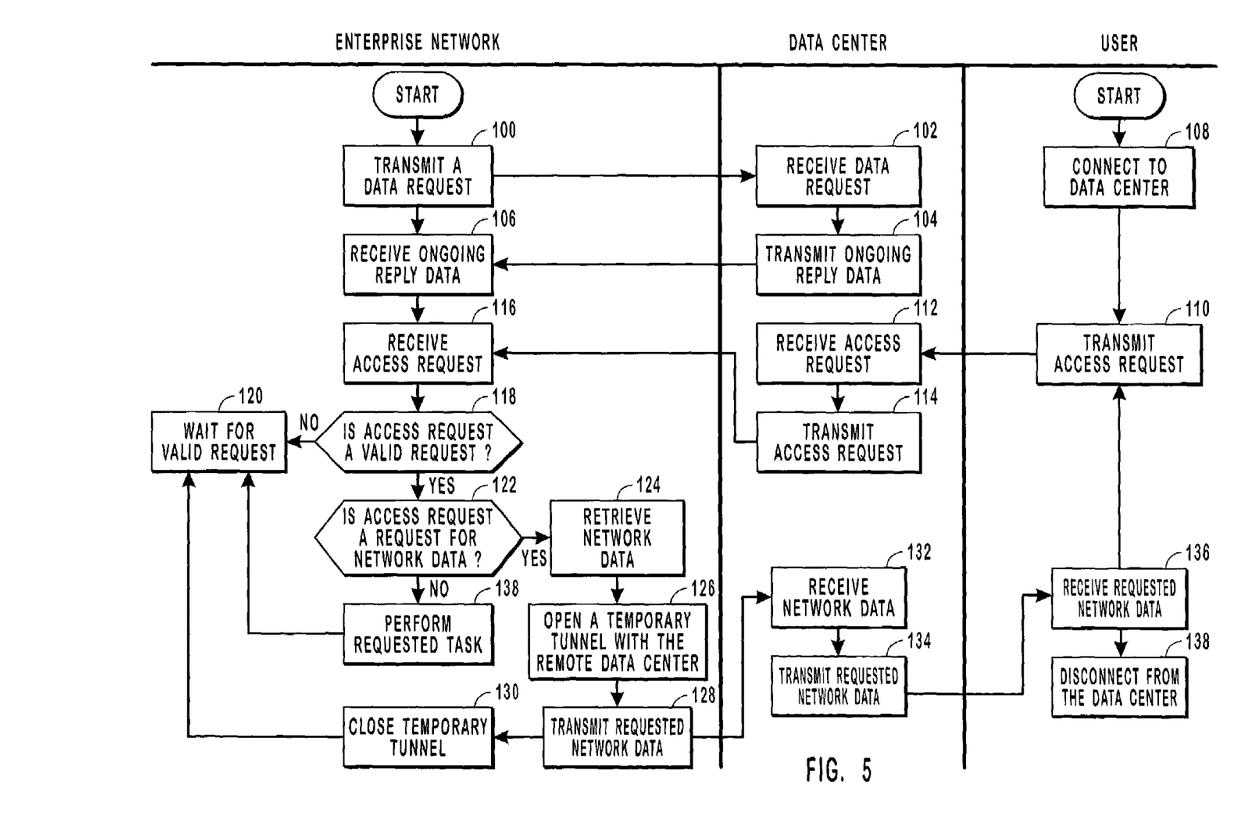
FIG. 5 illustrates a flow diagram of one embodiment of the method of the present invention for enabling a user to access network data from an enterprise network.

One embodiment of the method of the present invention for enabling a user access to network data from a remote location is illustrated in FIGS. 4 and 5. Turning now to FIG. 4, a user 10 wishing to access network data 22 of the enterprise network 40 from a remote location opens a line of communication 84 with the data center 44 using a communication device such as a telephony device or a computing device that is connected to the Internet. The data center 44 authenticates the identity of the user 10 to verify that the user 10 has authority to access network data 22 of the enterprise network 40. In one embodiment, the user's identity is authenticated when the user, using a telephony device or Internet computing device, enters a personal identification number. In another embodiment the user's identity is confirmed over the Internet using encryption technology, such as twin-key encryption, with corresponding public and private keys assigned to the user 10. One skilled in the art will recognize there are various methods for authenticating the identity of a user, any of which may be used in accordance with the present invention. Other such methods for authenticating the identity of a user include, but are not limited to, tokens and smart cards.

Once the identity of the user 10 is authenticated, the user transmits an access request to the data center 44 where it is received by the web server 60. Access request 70 may include any request requiring access to network data 22. For example, access request 70 may include a request to receive access to email messages, web pages or other data of the enterprise network that is protected behind a firewall infrastructure or accessible to the enterprise network. In one embodiment, the user 10 uses a computer device to open a line of communication 84 with the web server 60 over the Internet. In this embodiment, the access request 70 is received directly by the web server 60. In another embodiment, a user 10 uses a telephone device to transmit the access request 70 to the data center 44. According to this alternative embodiment, the access request is received indirectly by the web server 60 through telephony nodes 80, as described above in reference to FIG. 2.

Upon receiving the access request 70, the web server 60 transmits the access request 70 to the enterprise network 40 through the established data tunnel 42 that was opened at the initial request of the enterprise network 40, as described above with reference to FIGS. 2 and 3. The access request 70 is packetized with the reply data 53.

Access request 70 is received by the enterprise network 40 at the SVPN module 52. The enterprise network 40 processes the access request 70 by performing any act on the network data 22 that is requested by the access request 70. In one embodiment, the acts that can be performed on network data are limited to predefined acts according to the configuration of the SVPN module 52. The predefined acts can include any acts that an enterprise network wishes to enable the SVPN module 52 to allow. By allowing the SVPN module 52 to control what acts are performed on the network data 22, the enterprise network 40 is able to maintain control over access to network data 22 and can control how network data 22 is manipulated within in the enterprise network 40. Predefined acts may include, but are not limited to, retrieving email headers, retrieving email message bodies, retrieving web page data, deleting email, faxing email data or web page data to the user, transmitting network data 22 to the data center 44. The SVPN module 52 obtains network data from the enterprise network using an appropriate means, which may include, but is not limited to, Post Office Protocol (POP) or Simple Mail Transfer Protocol (SMTP).

The SVPN module 52 transmits network data 22 back to the data center 44 over a second data tunnel 90. The second data tunnel 90 operates as a temporary virtual private network between the enterprise network 40 and data center 44. Data tunnel 90 is established through the same port, Internet "port 443," that is used for data tunnel 42, and uses the same protocols discussed above to ensure security of the data transmission. In another embodiment, "port 80" is used with corresponding protocols. Proxy server 82 ensures that desired protocols are complied with.

Data tunnel 90 is established with the same web server 60 that is transmitting reply data 53 to the enterprise network 40 or with another web server, not shown, of the data center 44. Data tunnel 90 is closed and the user 10 is provided access to network data 22 as soon as it is received by the data center 44. If a telephone device is used by the user 10 to communicate with the data center 44 then the network data 22 is transmitted from the web server 60 to the user through the telephony nodes 80, shown in FIG. 2.

It should be appreciated that this invention can be practiced in combination with U.S. patent application Ser. No. 09/464,989, filed Dec. 16, 1999, entitled "Voice Interface for Electronic Documents," which is incorporated herein by reference, to enable a user to receive audio access to network data. In one embodiment, network data 22 comprises an email message and the data center 44 reads the text of the email message to the user 10 over the user's telephone device, or alternatively displays the email message on the user's telephone device. In another embodiment, the user 10 accesses network data 22 directly over the Internet from a line of communication 84 that is established directly with the web server 60.

A user can generate any number of access requests which will each be processed discretely. By breaking up user requests into discrete transactions, the present invention enhances security and control over network data by preventing a user, authorized or not, from gaining too much control over network data.

FIG. 5 illustrates a flow diagram of one embodiment of the present invention. As shown, in step 100, the enterprise network transmits a data request to the data center. Upon receiving the data request, step 102, the data center transmits ongoing reply data back to the enterprise network, step 104. In one embodiment, the reply data includes Markup Language Data, such as HTML data and XML data. In step 106, the enterprise network receives the ongoing reply data. Steps 100–106 establish a data tunnel between the enterprise network and the data center. In one embodiment, the data tunnel is established through port "443." In another embodiment, the data tunnel is established through port "80."

A user accesses network data of the enterprise network by first connecting to the data center, step 108. Next, the user generates and transmits an access request to the data center, step 110. In one embodiment, the access request is generated by the user using a telephone device. In an alternative embodiment, the user generates the access request over the Internet using a computer. Upon receiving the access request, step 112, the data center transmits the access request to the enterprise network, step 114, through the data tunnel that was established in steps 100–106.

In step 116, the enterprise network receives the access request and subsequently, in step 118, determines whether the access request is a valid access request. This may include verifying that the access request requires only predefined and authorized acts to be performed on the network data. It may also include the act of validating the identity of the user. As a matter of illustration, and not limitation, step 118 may result in the determination that retrieving an email message is a valid request and that running an attached executable program is not a valid request. The determination of what constitutes a valid access request can be predetermined and is controlled by the SVPN module. If the access request is not valid, the enterprise network does not process the request, but waits until a valid request is received, step 120.

If the access request is valid and it requires network data to be transmitted back to the user, then the network data is retrieved, in step 124, and subsequently transmitted to the data center, step 128, through a temporary data tunnel that is opened between the enterprise network and the data center, shown in step 126. In this embodiment, the temporary data tunnel opened in step 126 is different than the data tunnel established in steps 100–106. It should be appreciated, however, that both tunnels can be established over the same ports of the enterprise network.

After the network data is transmitted to the data center, the temporary data tunnel is closed, step 130, and the enterprise network waits for subsequent valid request to be received, step 120. If the access request requires an act to be performed, such as deleting email, faxing email messages, and forwarding email, the enterprise network performs the required task, step 138, and waits for a subsequent valid request to be received, step 120.

The data center transmits the requested network data to the user, step 134, as soon as it is received from the enterprise network, step 132. In one embodiment, this is accomplished by displaying the requested network data on a web page that being viewed by the user. In another embodiment, the requested network data is transmitted to a telephone device that is being used by the user, in either digital format or in audio format. The user receives the requested network data, step 136, and either disconnects from the data center, step 138, or transmits a subsequent access request to the data center, step 110.

According to the present invention, a user can also access network data that is cached in the database of the data center. According to this embodiment, described in reference to FIG. 2, network data 22 is cached in database 62, even before the user 10 generates an access request 70 for the network data 22. This embodiment is particularly useful for enabling a user 10 to quickly access network data 22 when the network data 22 is disconnected. Network data 22 is disconnected whenever it is not easily or quickly retrievable by the enterprise network 40. For example, if network data 22 is stored in a very large remote memory device within the enterprise network 40, it may take several minutes for the network data 22 to be retrieved. Other network data 22 that is disconnected includes data that is stored on the desktop or local computer drive of a computer that is turned off. Yet another example of disconnected network data is any data that is stored on a portable computer or storage device that is periodically disconnected from the enterprise network 40, such as a laptop computer or a PDA.

According to this embodiment, the enterprise network 40 establishes a new temporary data tunnel between the SVPN 52 and the web server 60. The temporary data tunnel is established in similar fashion to that of data tunnel 90, which is described in reference to FIG. 4. Once the temporary data tunnel is established, network data 22 is uploaded to the database 62 of the data center 44 through the temporary data tunnel. The process of uploading the network data 22 includes the act of packetizing the network data according to the established protocols that have been described above. Once the network data 22 is received, the data center 44 caches a copy of the network data 22 in the database 62. The cached copy of network data 22 is updated whenever a newer version of the network data 22 is received by the database 60. The frequency of which newer versions of the network data 22 are received is predetermined by the authorization and configuration of the enterprise network 40.

In one example, which is given as a matter of illustration and not limitation, the enterprise network generates notices that are received by all users of the enterprise network. The notices remind the users to upload their email contacts, address lists, corporate files, and other designated network data 22 so that the updated data can be retrieved off site, away from the enterprise network 40. According to this embodiment, the user 10 controls what network data 22 is transmitted to the data center 44 and what network data 22 is cached in the database 62 according to how the user 10 responds. The user 10 may, for example, respond by ignoring the notice. Alternatively, the user 10 may respond by initiating a command that allows the SVPN 52 module to upload the designated network data 22 to the database 62 of the data center 44. As previously discussed, the updates to the network data are transmitted through a temporary data tunnel that is established between the SVPN 52 module and the web server 60. Upon receiving the data packets, the web server 60 decrypts the user's network data 22 and sends it to database 62 where it is cached.

It should be appreciated that this embodiment enables a user to synchronize disconnected data over a temporary data tunnel that operates as a virtual private network so that it can be accessed from a remote location at a later time. This embodiment also enables a user to quickly access a copy of the network data, which is cached in the database of the data center, when network data is disconnected from the enterprise network. Network data is disconnected, for example, when it is stored on a portable and physically disconnected computer, stored on a disabled network storage drive, when the network data is difficult to retrieve because of network problems, and when the network data takes a long time to retrieve because of slow connections and processing speeds.

According to the present embodiment, a user 10 accesses network data 22, such as email contacts, by calling into the data center 44 using a telephone system and by generating an access request 70 for the network data 22. Telephony nodes 80 at the data center 44 receive the user's call and accompanying access request 70. The telephony nodes 80 also retrieve the uploaded network data 22 from the database 62 and transmit the uploaded network data 22 back to the user 10. According to an alternative embodiment, the user 10 accesses the data center 44 directly over the Internet, in which case the web server 60 retrieves the user's uploaded network data 22 from the database 62 and transmits it back to the user 10.

The present embodiment also enables a user 10 to update network data 22 by issuing commands directly to the data center 44 over an established line of communication 84 between the user 10 and the data center 44. As a matter of illustration, a user can issue a command to delete an email contact from the cached copy of network data stored in the database of the data center. According to this example, the data center 44 responds by deleting the email contact, which effectively updates the cached copy of the network data at the data center. Data center 44 then transmits information regarding the update to the enterprise network 40. This is accomplished by embedding the update information within the reply data 53 that is being transmitted to the enterprise network 40 through an established data tunnel, such as data tunnel 42. The transmission of reply data 53 is shown and described in more detail in reference to FIGS. 3 and 4.

The SVPN module receives the network data updates and updates the enterprise network data accordingly. This synchronizes the enterprise network data 22 with the cached copy of the network data that is stored in database 62 of the data center 44. It should be appreciated that this embodiment enables a remote user to update network data that is stored at the database of the data center and to further update network data stored at the enterprise network by synchronizing the network data of the enterprise network with the updated cache copy of network data stored at the data center.

In view of the forgoing, it should be appreciated that the present invention is an improvement over the prior art. In particular, the present invention enables a user to have mobile remote access to network data over a secure data channel while preserving a business's ability to limit how much access to network data is permitted through the data channel. The present invention also enables a remote user to access network data that is disconnected from the enterprise network. Furthermore, the present invention enables a user to update network data from a remote location over a virtual private network data tunnel.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a data center capable of communicating with a remote enterprise network, a method for enabling a user to access network data of the remote enterprise network through a data tunnel between the data center and the remote enterprise network that operates as a virtual private network, the method comprising the acts of:
   in response to receiving a data request from the remote enterprise network, establishing the data tunnel with the remote enterprise network, by transmitting reply data to the remote enterprise network, the data tunnel operating as a virtual private network a firewall of the remote enterprise network without requiring a virtual private network node to be placed at the firewall;
   continuing to transmit the reply data to the remote enterprise network in an ongoing manner such that the data tunnel is kept open;
   receiving an access request from a user for network data from the remote enterprise network;
   transmitting the access request to the remote enterprise network using the existing data tunnel that has been established and exists prior to the data center having received the access request;
   receiving the network data from the remote enterprise network in response to the access request; and
   transmitting the network data to the user.

2. A method as defined in claim 1, wherein the access request is received by a designated server, and wherein the designated server is one of multiple servers of the data center.

3. A method as defined in claim 2, wherein a database of the remote enterprise network is notified which of the multiple servers is the designated server, the designated server notifying the database when the data tunnel is established.

4. A method as defined in claim 3, wherein the access request is received by a designated telephony node of the data center, and wherein the user generates the access request using a telephone system.

5. A method as defined in claim 3, wherein the access request is received by one of multiple servers of the data center over the internet, and wherein the access request is generated by the user using a device connected to the Internet.

6. A method as defined in claim 4, wherein the designated telephony node of the data center transmits the access request to the designated server.

7. A method as defined in claim 6, wherein the designated telephony node determines which of the multiple servers is the designated server by communicating with at least one of the multiple servers.

8. A method as defined in claim 6, wherein the designated telephony node determines which of the multiple servers is the designated server by communicating with the database.

9. A method as defined in claim 1, wherein the act of receiving an access request to access network data of the remote enterprise network from the user further comprises the act of authenticating the identity of the user.

10. A method as defined in claim 9, wherein authenticating the identity of the user comprises the act of receiving a valid personal identification number.

11. A method as defined in claim 4, wherein the act of transmitting the network data to the user includes the acts of:
    transmitting the network data from the designated sewer to the designated telephony node; and transmitting the network data from the designated telephony node to the telephone system used by the user.

12. A method as defined in claim 5, wherein the act of transmitting the network data to the user includes the net of transmitting the network data from the designated server to the device that is connected to the Internet.

13. In an enterprise network capable of communicating with a remote data center network, a method for enabling a user to access network data of the enterprise network through a data tunnel between the remote data center and the enterprise network that operates as a virtual private network, the method comprising the acts of transmitting a data request to the remote data center;

receiving reply data that has been transmitted by the remote data center in response to the data request and that establishes the data tunnel with the remote data center, the data tunnel operating as a virtual private network through a firewall or the enterprise network without requiring a virtual private network node to be placed at the firewall;

receiving the reply data from the remote data center in an ongoing manner such that the data tunnel is kept open;

receiving, from the remote data center, an access request to access network data of the enterprise network, the access request having been received by the remote data center from the user and thereafter transmitted by the remote data center to the enterprise network through the data tunnel that has been established and exists prior to the remote data center having received the access request; and in response to the access request, transmitting the network data to the remote data center such that the user is enabled to access the network data.

14. A method as defined in claim 13, wherein the data request includes a uniform resource identifier.

15. A method as defined in claim 13, wherein the data request is transmitted through the firewall.

16. A method as defined in claim 15, wherein the data request is transmitted through a proxy server.

17. A method as defined in claim 13, wherein the reply data is received through port 443.

18. A method as defined in claim 17, wherein the reply data is received using Secure Sockets Layer protocol.

19. A method as defined in claim 13, wherein the reply data is received through port 80.

20. A method as defined in claim 13, wherein the act of transmitting the network data to the remote data center includes the acts of:

encrypting the network data to comply with Secure Sockets Layer protocol, transmitting the network data to the remote data center through a second data tunnel, such that the transmission of the network data operates as a temporary virtual private network; and closing the second data tunnel.

21. A method as defined in claim 13, wherein upon receiving the access request, the method further comprises the act of:

performing an act upon the network data.

22. A method as defined in claim 21, wherein performing an act upon the network data includes retrieving email message data.

23. In a data center capable of communicating with a remote enterprise network, a method for enabling a user to access network data of the remote enterprise network through a data tunnel between the data center and the remote enterprise network that operates as a virtual private network, the method comprising the acts of:

receiving, from the remote enterprise network, a uniform resource identifier associated with a resource of a server of the data center;

in response to receiving the uniform resource identifier, invoking the resource to establish the data tunnel with the remote enterprise network by transmitting reply data, and continuing to transmit the reply data to the remote enterprise network in an ongoing manner, such that the data tunnel is kept open between the data center and the remote enterprise network, the data tunnel operating as a virtual private network through a firewall of the remote enterprise network without requiring a virtual private network node to be placed at the firewall;

receiving an access request to access network data of the remote enterprise network from the user;

inserting the access request into the reply data and transmitting the access request to the remote enterprise network using the data tunnel that has established and exists prior to the data center having received the access request;

receiving the network data from the remote enterprise network in response to the access request; and transmitting the network data to the user.

24. A method as defined in claim 23, wherein the act of receiving the network data from the remote enterprise network comprises the act of receiving through a second data tunnel the network data from the remote enterprise network, the second data tunnel operating as a temporary virtual private network is closed after the network data is received by the data center.

25. A method as defined in claim 23, wherein the act of transmitting the access request to the remote enterprise network comprises the act or transmitting the access request using Secure Sockets Layer protocol.

26. A method as defined in claim 23, wherein the act of receiving an access request to access network data of the remote enterprise network from the user further comprises the act of authenticating the identity of the user.

27. A method as defined in claim 26, wherein authenticating the identity of the user comprises the act of receiving a valid personal identification number.

28. A computer program product for implementing in a data center a method for enabling a user to access network data of a remote enterprise network through a data tunnel between the data center and the remote enterprise network that operates as a virtual private network, the computer program product comprising:

a computer-readable medium carrying computer-executable instructions for implementing the method, the computer-executable instructions comprising:

program code means for establishing the data tunnel with the remote enterprise network by transmitting reply data to the remote enterprise network in response to receiving a data request from the remote enterprise network, the data tunnel operating as a virtual private network through a firewall of the remote enterprise network without requiring a virtual private network node to be placed at the firewall;

program code means for continuing to transmit the reply data to the remote enterprise network in an ongoing manner such that the data tunnel is kept open;

program code means for receiving an access request from a user for network data from the remote enterprise network;

program code means for transmitting the access request to the remote enterprise network using the data tunnel that has been established and exists prior to the data center having received the access request;

program code means for receiving the network data form the remote enterprise network in response to the access request; and program code means the transmitting the network data to the user.

29. A computer program product as defined in claim 28, wherein the computer-executable instructions further comprise program code means for authenticating the identity of the user.

30. A computer program product as defined in claim 28, wherein the computer-executable instructions further comprise program code means for enabling telephony nodes of the data center to receive the access request and to transmit the access request to a designated server, wherein the designated server is transmitting the ongoing reply data to the remote enterprise network.

31. A computer program product as defined in claim 30, wherein the designated server is one of multiple servers of the data center, and wherein the user generates the access request using a telephone system.

32. A computer program product as defined in claim 28, wherein the computer-executable instructions further comprise program code means for caching a copy of network data in a database of the data center.

33. A computer program product as defined in claim 32, wherein the computer-executable instructions further comprise program code means for transmitting the cached copy of the network data to the user in response to receiving the access request from the user.

34. In an enterprise network capable of communicating with a remote data center, a method for enabling a user to manipulate network data of the enterprise network through a data tunnel between the remote data center and the enterprise network that operates as a virtual private network, the method comprising the acts of transmitting a data request to the remote data center;

receiving reply data that has been transmitted by the remote data center in response to the data request and that establishes the data tunnel with the remote data center, the data tunnel operating as a virtual private network through a firewall of the enterprise network without requiring a virtual private network node to be placed at the firewall;

receiving the reply data from the remote data center in an ongoing manner such that the data tunnel is kept open;

receiving, from the remote data center, a user request for an act to be performed on network data of the enterprise network, the user request having been received by the remote data center from the user and thereafter transmitted by the remote data center to the enterprise network through the data tunnel that has been established and exists prior to the data center having received the user request; and upon receiving the user request, performing the act on network data of the enterprise network.

35. A method as defined in claim 34, wherein performing an act upon the network data includes deleting email.

36. A method as defined in claim 35, wherein performing an act upon the network data includes faxing the network data to the user.

37. A method as defined in claim 35, wherein performing an act upon the network data includes retrieving a web page.

38. A method as defined in claim 35, wherein performing an act upon the network data includes retrieving email messages.

39. In a data center capable of communicating with a remote enterprise network, a method for enabling a user to access network data of the remote enterprise network through a data tunnel between tho data center and the remote enterprise network that operates as a virtual private network, the method comprising:

establishing the data tunnel with the remote enterprise network by transmitting reply data to the remote enterprise network in response to receiving a data request from the remote enterprise network;

continuing to transmit the reply data to the remote enterprise network in an ongoing manner to keep the data tunnel open;

receiving network data from the remote enterprise network through the data tunnel, the data tunnel operating as a virtual private network through a firewall of the enterprise network without requiring a virtual private network node to be placed at the firewall;

caching a copy of the network data in a database of the data center, receiving an access request to access network data of the remote enterprise network from the user;

retrieving the network data from the database in response to the access request; and transmitting the network data to the user.

40. A method as defined in claim 39, wherein the network data of the enterprise network is disconnected from the enterprise network after the network data is received by the data center.

41. A method as defined in claim 39, wherein the network data of the enterprise network is disconnected from the user after the network data is received by the data center.

42. A method as defined in claim 39, wherein the user determines what network data is transmitted to the data center, and wherein the user determines what network data is cached in the database.

43. A method as defined in claim 39, wherein the act of receiving an access request to access network data of the remote enterprise network from the user further comprises the act of authenticating the identity of the user.

44. A method as defined in claim 39, wherein the access request comprises a command to update network data.

45. A method as defined in claim 44, further comprising the acts of updating the cached copy of network data, and transmitting update information to the enterprise network.

* * * * *

UNITED STATES PATENT AND TRADEMARK OFFICE
CERTIFICATE OF CORRECTION

| | |
|---|---|
| PATENT NO. | : 7,124,189 B2 |
| APPLICATION NO. | : 09/767465 |
| DATED | : October 17, 2006 |
| INVENTOR(S) | : Summers et al. |

It is certified that error appears in the above-identified patent and that said Letters Patent is hereby corrected as shown below:

Title Page
Item 56, References Cited, Other Publications, add --S. Cobbs, Security Issues in Internet Commerce, June 1996, pgs. 186-191.--

Column 9
Line 15, change "10" to --70--

Column 12
Line 41, change "60" to --62--

Column 14
Line 13, after "network" insert --through--
Line 66, change "sewer" to --server--

Column 15
Line 4, change "net" to --act--
Line 12, after "acts of" insert --:--

Column 16
Line 37, change "or" to --of--

Column 17
Line 11, after "means" change "the" to --for--
Line 42, after "acts of" insert --:--

UNITED STATES PATENT AND TRADEMARK OFFICE
CERTIFICATE OF CORRECTION

PATENT NO. : 7,124,189 B2
APPLICATION NO. : 09/767465
DATED : October 17, 2006
INVENTOR(S) : Summers et al.

It is certified that error appears in the above-identified patent and that said Letters Patent is hereby corrected as shown below:

<u>Column 18</u>
Line 16, change "tho" to --the--

Signed and Sealed this

Eighth Day of May, 2007

JON W. DUDAS
*Director of the United States Patent and Trademark Office*